United States Patent
Ishijima

(10) Patent No.: US 9,950,643 B2
(45) Date of Patent: Apr. 24, 2018

(54) REAR STRUCTURE OF VEHICLE BODY

(71) Applicant: HONDA MOTOR CO., LTD., Tokyo (JP)

(72) Inventor: Shigeo Ishijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/294,007

(22) Filed: Oct. 14, 2016

(65) Prior Publication Data

US 2017/0106769 A1    Apr. 20, 2017

(30) Foreign Application Priority Data

Oct. 20, 2015    (JP) ................. 2015-206409

(51) Int. Cl.
| | |
|---|---|
| *B62D 25/08* | (2006.01) |
| *B60N 2/28* | (2006.01) |
| *B60N 2/68* | (2006.01) |
| *B60N 2/015* | (2006.01) |

(52) U.S. Cl.
CPC .............. *B60N 2/015* (2013.01); *B60N 2/28* (2013.01); *B60N 2/289* (2013.01); *B60N 2/682* (2013.01); *B62D 25/08* (2013.01); *B60Y 2304/07* (2013.01); *B62D 25/087* (2013.01)

(58) Field of Classification Search
CPC .......... B60N 2/26; B60N 2/28; B60N 2/2806; B60N 2/2809; B60N 2/682; B60N 2/015; B60N 2/289; B62D 25/08; B62D 25/20; B62D 25/2027; B62D 25/087
USPC ...................................... 296/24.43
See application file for complete search history.

(56) References Cited

U.S. PATENT DOCUMENTS

| | | | | |
|---|---|---|---|---|
| 6,416,129 | B1 * | 7/2002 | Hirota ................. | B60N 2/2827 |
| | | | | 297/250.1 |
| 6,443,518 | B1 * | 9/2002 | Rohl ................... | B62D 25/082 |
| | | | | 296/187.12 |
| 6,634,710 | B1 * | 10/2003 | Adamson, Sr. ........ | B60N 2/289 |
| | | | | 248/503.1 |
| 9,371,092 | B2 * | 6/2016 | Park ...................... | B62D 25/02 |
| 2002/0030378 | A1 * | 3/2002 | Takahashi ............... | B60N 2/28 |
| | | | | 296/63 |

(Continued)

FOREIGN PATENT DOCUMENTS

| | | |
|---|---|---|
| JP | 2002-2347 A | 1/2002 |
| JP | 3506367 B2 | 3/2004 |

(Continued)

OTHER PUBLICATIONS

Office Action dated Jul. 28, 2017, issued in counterpart Japanese Application No. 2015-206409, with English machine translation. (6 pages).

*Primary Examiner* — Gregory Blankenship
(74) *Attorney, Agent, or Firm* — Westerman, Hattori, Daniels & Adrian, LLP

(57) ABSTRACT

In a rear structure of a vehicle body, a rear bulkhead is erected from a floor panel and the erected rear bulkhead is coupled to a vehicle body to separate a passenger compartment from a cargo compartment. First seat anchors are coupled to the rear bulkhead using multiple rivets. Second seat anchors are coupled to the rear bulkhead using multiple rivets. The first seat anchors and the second seat anchors support a child seat.

14 Claims, 12 Drawing Sheets

(56) References Cited

U.S. PATENT DOCUMENTS

| | | | |
|---|---|---|---|
| 2005/0225138 A1* | 10/2005 | Laporte | B60N 2/2809 297/254 |
| 2006/0119140 A1* | 6/2006 | Yamazaki | B62D 25/08 296/203.04 |
| 2007/0158977 A1* | 7/2007 | Yasukouchi | B62D 25/2027 296/203.04 |
| 2010/0327628 A1* | 12/2010 | Taguchi | B60K 15/06 296/193.07 |
| 2014/0152054 A1* | 6/2014 | Yano | B62D 25/087 296/193.08 |
| 2016/0001822 A1* | 1/2016 | Cao | B62D 25/20 296/193.07 |
| 2016/0083011 A1* | 3/2016 | Kawaguchi | B62D 21/02 296/203.01 |
| 2016/0144753 A1* | 5/2016 | del Puerto Camargo | B60N 2/2887 297/452.48 |
| 2017/0106769 A1* | 4/2017 | Ishijima | B60N 2/015 |
| 2017/0113541 A1* | 4/2017 | Muramatsu | B60K 15/063 |

FOREIGN PATENT DOCUMENTS

| | | |
|---|---|---|
| JP | 2010-247610 A | 11/2010 |
| JP | 4648733 B2 | 3/2011 |

* cited by examiner

REAR STRUCTURE OF VEHICLE BODY

CROSS REFERENCES TO RELATED APPLICATIONS

The present application claims priority under 35 U.S.C. § 119 to Japanese Patent Application No. 2015-206409, filed Oct. 20, 2015, entitled "Rear Structure of Vehicle Body." The contents of this application are incorporated herein by reference in their entirety.

TECHNICAL FIELD

The present disclosure relates to a rear structure of a vehicle body, in which a rear bulkhead is erected from a floor panel.

BACKGROUND

Examples known as a rear structure of a vehicle body include a rear structure of a fuel cell vehicle in which a rear bulkhead is disposed on the floor panel to separate a passenger compartment from a cargo compartment (see, for example, Japanese Patent No. 4648733).

Some of rear structures of at vehicle body that include a seat belt anchor on the floor panel have been known (see, for example, Japanese Patent No. 3506367).

To install both a rear bulkhead and a seat belt anchor on the floor panel, the rear bulkhead and the seat belt anchor are generally separately mounted on the floor panel. Thus, the operation of installing the rear bulkhead and the seat belt anchor takes longer time and is susceptible to improvement in this view point.

Some of rear structures of a vehicle body include a seat anchor that supports a child seat. Such a seat anchor is usually mounted on the floor panel separately from the rear bulkhead in the same manner as the seat belt anchor. Thus, the operation of installing the rear bulkhead and the seat anchor takes longer time.

SUMMARY

The present application describes, for example, a rear structure of a vehicle body that can enhance an efficiency in installing a rear bulkhead and a seat anchor.

According to a first aspect, a rear structure of a vehicle body includes a floor panel, a rear bulkhead coupled to the vehicle body in a state of being erected from the floor panel and separating a passenger compartment from a cargo compartment, and a seat anchor that is coupled to the rear bulkhead to support a child seat.

As described above, a seat anchor of a child seat is coupled to the rear bulkhead. In other words, by attaching the rear bulkhead to the vehicle body, a seat anchor can also be attached to the vehicle body. Thus, compared to the case where a rear bulkhead and a seat anchor are separately attached to the vehicle body, the number of components attached to the vehicle body can be reduced. In other words, the number of components mounted on the vehicle body can be reduced.

This configuration can thus enhance an efficiency in installing a rear bulkhead and a seat anchor and enhance productivity.

According to a second aspect, the rear bulkhead preferably includes a bead directed toward a portion coupled to the vehicle body.

As described above, beads are directed toward portions coupled to the vehicle body. Thus, the strength and the rigidity of the portions of the bulkhead coupled to the vehicle body can be enhanced with the beads. This configuration can thus enhance the strength (so-called support strength) against the tensile load imposed on a seat anchor so that the tensile load can be borne by the seat anchor.

According to a third aspect, the seat anchor preferably includes an anchor bracket coupled to the rear bulkhead at at least two portions spaced apart from each other in a vehicle widthwise direction, and a substantially U-shaped anchor portion whose both end portions are attached to the anchor bracket. A connection portion is preferably disposed at an intersection point at which a center of the anchor bracket in the vehicle widthwise direction and a center of the anchor port ion in the vehicle widthwise direction intersect with each other and the connection portion is coupled with the floor panel.

As described above, a connection portion is disposed at an intersection point at which a center of the anchor bracket in the vehicle widthwise direction and a center of the anchor portion in the vehicle widthwise direction intersect with each other and the connection portion is coupled with the floor panel. Thus, the connection portion is positioned on an extension line of a tensile load when the tensile load is imposed on the anchor portion from a seat.

This configuration can thus stably support the tensile load imposed on the anchor portion at the connection portion and can enhance so-called load support stability.

Furthermore, since the connection portion is disposed at the center of the anchor bracket in the vehicle widthwise direction, the tensile load transmitted to the connection portion can be efficiently dispersed over the entire area of the anchor bracket, so that a so-called load dispersion effect can be enhanced.

Since the load support stability and the load dispersion effect are thus enhanced, support strength high enough to bear the tensile load can be obtained in a simple configuration in which the anchor bracket has the coupling hole at the intersection point.

According to a fourth aspect, the rear structure of a vehicle body preferably also includes rear frames disposed on a left side and a right side of the floor panel, and a cross member extending across the rear frames and joined to an undersurface of the floor panel. A bulkhead is disposed in an inner portion of the cross member. The anchor bracket is coupled to the bulkhead.

As described above, a bulkhead is disposed in an inner portion of the cross member and the anchor bracket is coupled to the bulkhead. Thus, the anchor bracket can be firmly supported by the bulkhead.

This configuration can thus fully support the tensile load imposed on a seat anchor using the anchor bracket and can further enhance the load support strength.

According to a fifth aspect, the rear structure of a vehicle body preferably also includes a coupling bracket disposed in a portion of the cross member adjacent to the bulkhead and to which a seat belt anchor that supports a seat belt is coupled, and a cover member disposed on the coupling bracket to cover a coupling member that couples the seat belt anchor to the coupling bracket.

As described above, a coupling bracket is disposed in a portion of the cross member adjacent to the bulkhead and a seat belt anchor (that is, a typical seat belt anchor) is coupled to the coupling bracket. Thus, the seat belt anchor can be firmly supported by the coupling bracket.

This configuration can thus fully support a tensile load imposed on the seat belt anchor using the coupling bracket.

Here, it is conceivable that a vehicle-mounted member such as a fuel tank (specifically, a hydrogen tank) is disposed on the vehicle rear side of the coupling bracket. A cover member is thus disposed on the coupling bracket to cover the coupling member from the vehicle rear. In case of, for example, a rear collision, the coupling member is prevented by the cover member from colliding against the vehicle-mounted member such as the fuel tank. This configuration can thus protect a vehicle-mounted member.

According to a sixth aspect, the rear structure of a vehicle body preferably also includes rear frames disposed on a left side and a right side of the floor panel. A seat anchor is preferably coupled to an outer left portion or an outer right portion of the rear bulkhead. The anchor bracket of the seat anchor is preferably coupled to the rear frames.

As described above, the anchor bracket is coupled to a left portion or a right portion of the rear bulkhead and the anchor bracket on the left portion or the right portion is coupled to the rear frames. The rear frames are long members extending in the vehicle front-rear direction. By coupling the anchor bracket to the long rear frames, the tensile load imposed on the anchor bracket can be efficiently dispersed over the rear frames. The tensile load imposed on the anchor bracket can thus be fully borne by the rear frames.

Here, the rear frames are members that constitute the vehicle body. The anchor bracket is supported by using the rear frames. Thus, a member specially designed for supporting the anchor bracket can be eliminated. The rear structure of a vehicle body can thus be simplified and lightened.

According to a seventh aspect, preferably, the anchor bracket includes a fold portion following a corner portion of the rear bulkhead, and the seat anchor includes a U-shaped reinforcing member disposed on an outer side of the fold portion.

As described above, the anchor bracket includes a fold portion and a U-shaped reinforcing member is disposed on the outer side of the fold portion. Thus, the strength and the rigidity of both sides of the anchor bracket can be secured by the reinforcing member without being affected by the presence of the fold portion.

Even when the tensile load in the vehicle widthwise direction (that is, the lateral direction) is imposed on the anchor bracket, the tensile load thus imposed, can be borne by the anchor bracket without the fold portion being deformed.

According to an eighth aspect, the rear structure of a vehicle body preferably also includes rear wheel houses joined to the rear frames, and an upper cross member extending across upper portions of the rear wheel houses. An upper portion of the rear bulkhead is preferably coupled to the rear wheel houses and the upper cross member.

As described above, an upper portion of the rear bulkhead is coupled to the rear wheel houses and the upper cross member. Here, the rear wheel houses and the upper cross member are members that constitute a rear structure of a vehicle body. Thus, the rear structure of a vehicle body can be reinforced with the rear bulkhead so that the strength and the rigidity of the rear structure of a vehicle body can be enhanced.

According to a ninth aspect, the rear bulkhead preferably includes a protrusion disposed at a center of a lower end portion of the rear bulkhead in a vehicle widthwise direction, the protrusion protruding downward, and a coupling portion that receives a seat cushion is preferably disposed on the protrusion.

As described above, a protrusion is disposed so as to protrude from a lower end portion of the rear bulkhead and a coupling portion is disposed on the protrusion. A coupling device of a seat cushion is attached, to the coupling portion.

The rear structure of a vehicle body includes an attachment bracket on the vehicle front side of the rear bulkhead, the attachment bracket receiving the seat cushion. A fastening device of the seat cushion is attached to the attachment bracket.

Here, by disposing the coupling portion on the protrusion, the coupling portion can be made as a member separate from the protrusion. Thus, the coupling portion can have a plate thickness the same as the plate thickness of the attachment bracket while the coupling portion retains its strength and rigidity. Thus, even in the case, for example, where the rear bulkhead is made of an aluminium alloy and has a plate thickness larger than the plate thickness of a steel plate, an existing seat-cushion coupling device made of a steel plate can be attached to the attachment hole of the coupling portion without there being a need for changing the existing seat-cushion coupling device.

Since this configuration is compatible with an existing current seat cushion, the need for another seat cushion is eliminated, whereby a stock management is facilitated.

In addition, by disposing the coupling portion, on the protrusion, the rear bulkhead can be lightened with the use of a material such as an aluminium alloy as the material of the rear bulkhead.

In the present application, for example, the efficiency in installing a rear bulkhead and a seat anchor can be enhanced by coupling the seat anchor to the rear bulkhead.

BRIEF DESCRIPTION OF THE DRAWINGS

The advantages of the disclosure, will become apparent, in the following description taken in conjunction with the following drawings.

DETAILED DESCRIPTION

Referring to the attached drawings, embodiments of the present application are described below. In the following description, "front (Fr)", "rear (Rr)", "left (L)", and "right (R)" correspond to the directions viewed from a driver.

Embodiment

A rear structure 10 of a vehicle body according to an embodiment is described below.

The rear structure 10 of a vehicle body has a substantially laterally symmetrical structure. Thus, members on the left side of the rear structure 10 of a vehicle body are denoted with the same reference symbols with those of members on the right side. The portions on the left side are described in detail and the portions on the right side may be omitted.

Figure 1:
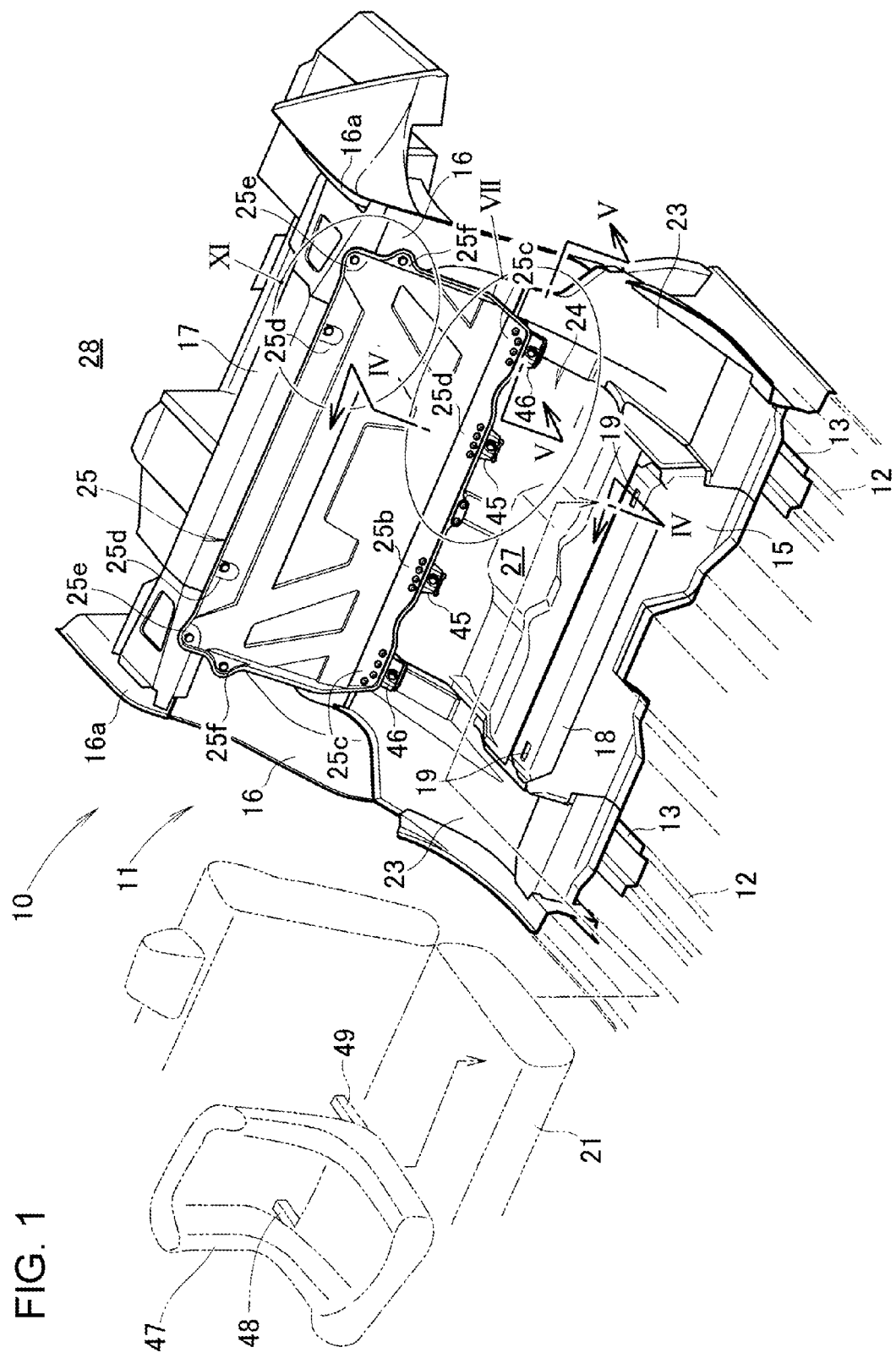
FIG. 1 is a perspective view of a rear structure of a vehicle body of one embodiment of the present application.
Figure 2:
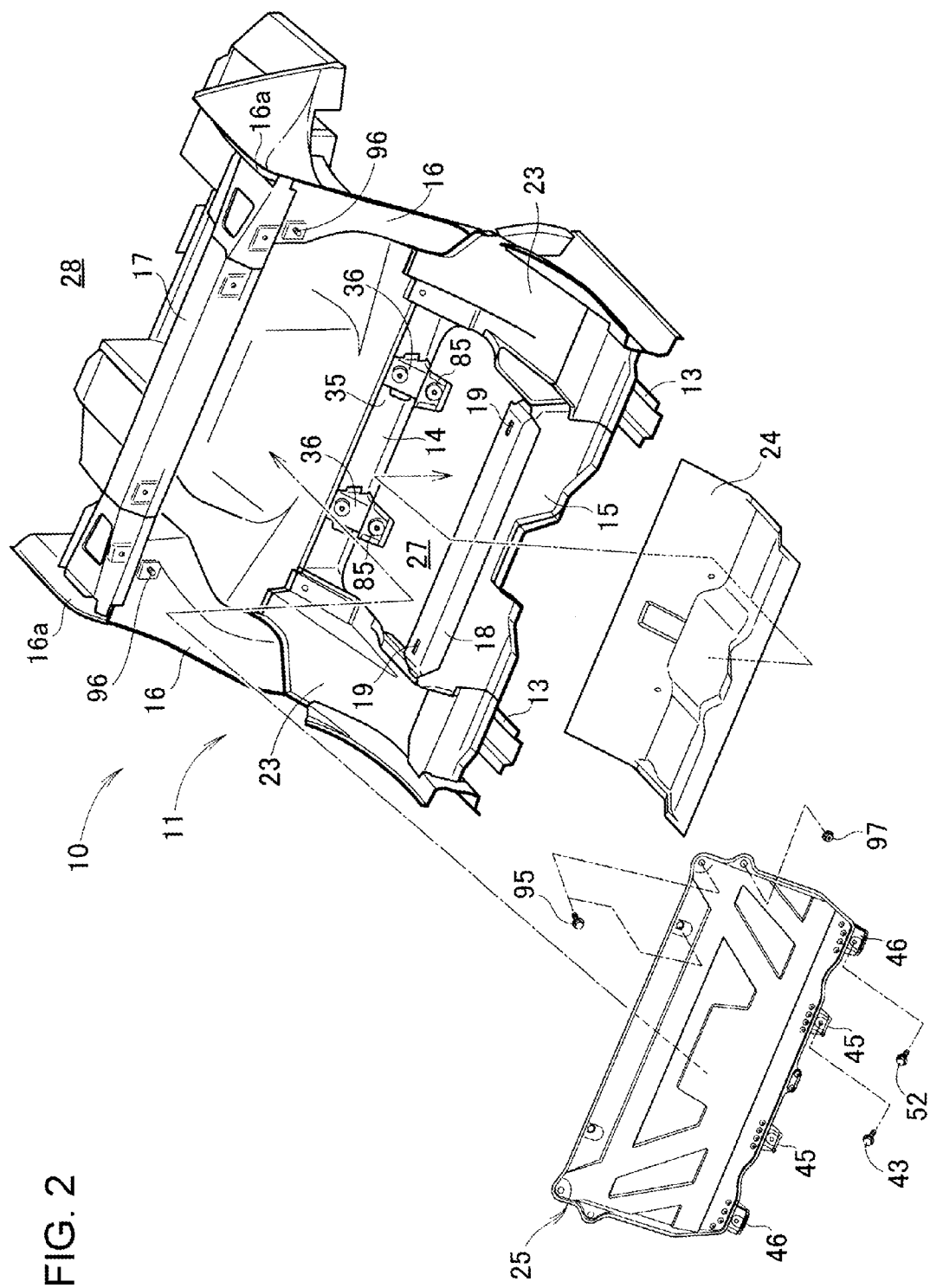
FIG. 2 is an exploded perspective view of the rear structure of a vehicle body illustrated in FIG. 1.

As illustrated in FIG. 1 and FIG. 2, the rear structure 10 of a vehicle body is a portion that constitutes, for example, a rear structure of a fuel-cell vehicle body 11. The fuel-cell vehicle body 11 is hereinafter simply referred to as a "vehicle body 11".

The rear structure 10 of a vehicle body includes floor frames 12, which extend in the vehicle front-rear direction, rear frames 13, which extend toward the vehicle rear from the floor frames 12, a first lower cross member (cross member) 14 and a second lower cross member 15, which extend across the rear frames 13 on both sides, rear wheel houses 16, joined to the rear frames 13, and an upper cross member 17, which extends across upper portions 16a of the rear wheel houses 16 on both sides.

The second lower cross member 15 is disposed on a vehicle front side of the first lower cross member 14. An attachment bracket 18 made of a steel plate is attached to an upper portion of the second lower cross member 15. Multiple attachment holes 19 are formed in the attachment bracket 18. Coupling devices (such as hooks) of a seat cushion 21 are attached to the multiple attachment holes 19.

The rear structure 10 of a vehicle body also includes rear side panels 23, which cover the upper side of the rear frames 13, a rear floor panel (floor panel) 24, disposed between the rear side panels 23 on both sides, and a rear bulkhead 25, which erects from the rear floor panel 24.

The rear frames 13 are disposed on the left and right sides of the rear floor panel 24. Since the rear bulkhead 25 is erected from the rear floor panel 24, the in-vehicle space is divided by the rear bulkhead 25 into a passenger compartment 27 and a cargo compartment 28.

Figure 3:
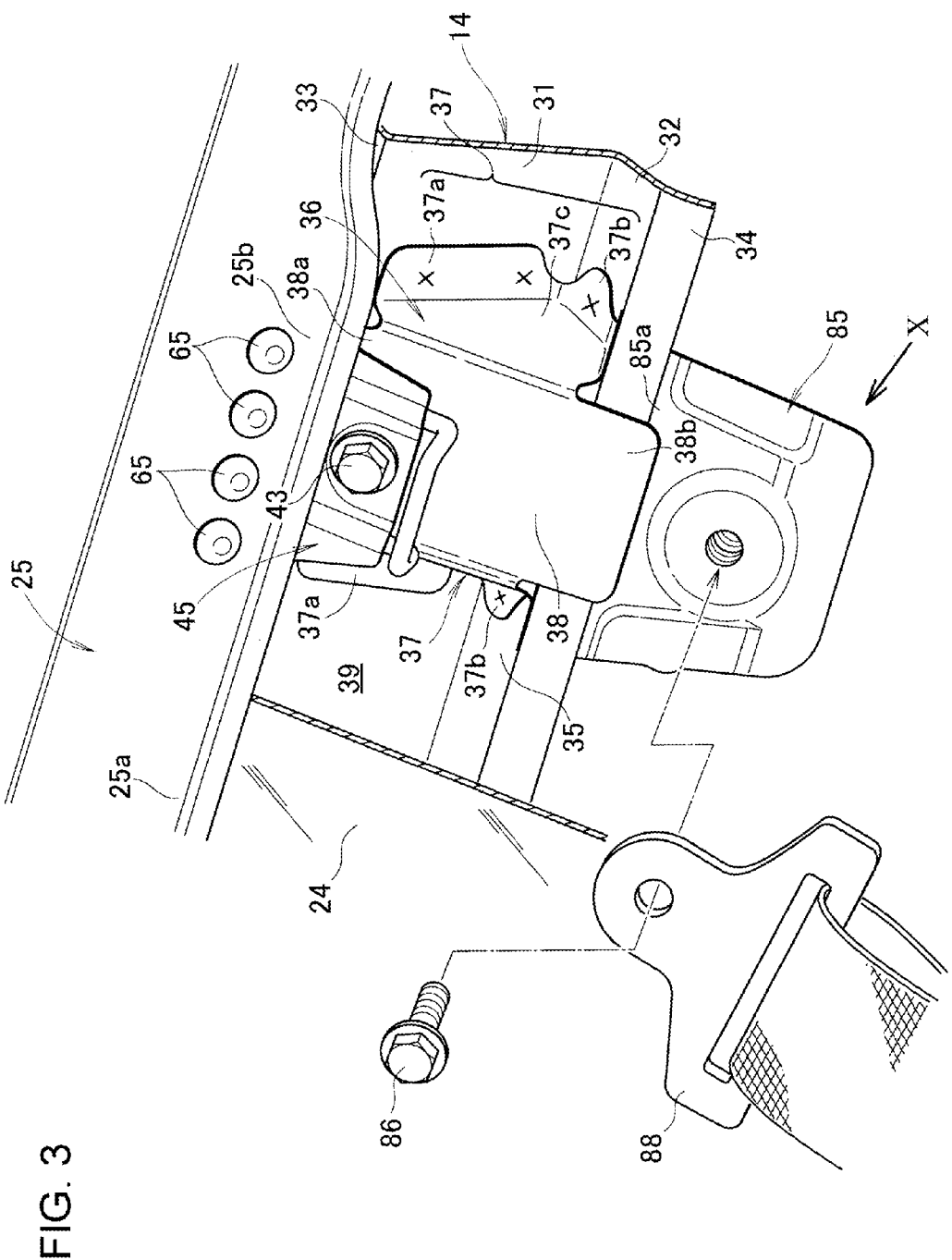
FIG. 3 is a perspective view of a first lower cross member and an anchor receiving portion illustrated in FIG. 2.
Figure 4:
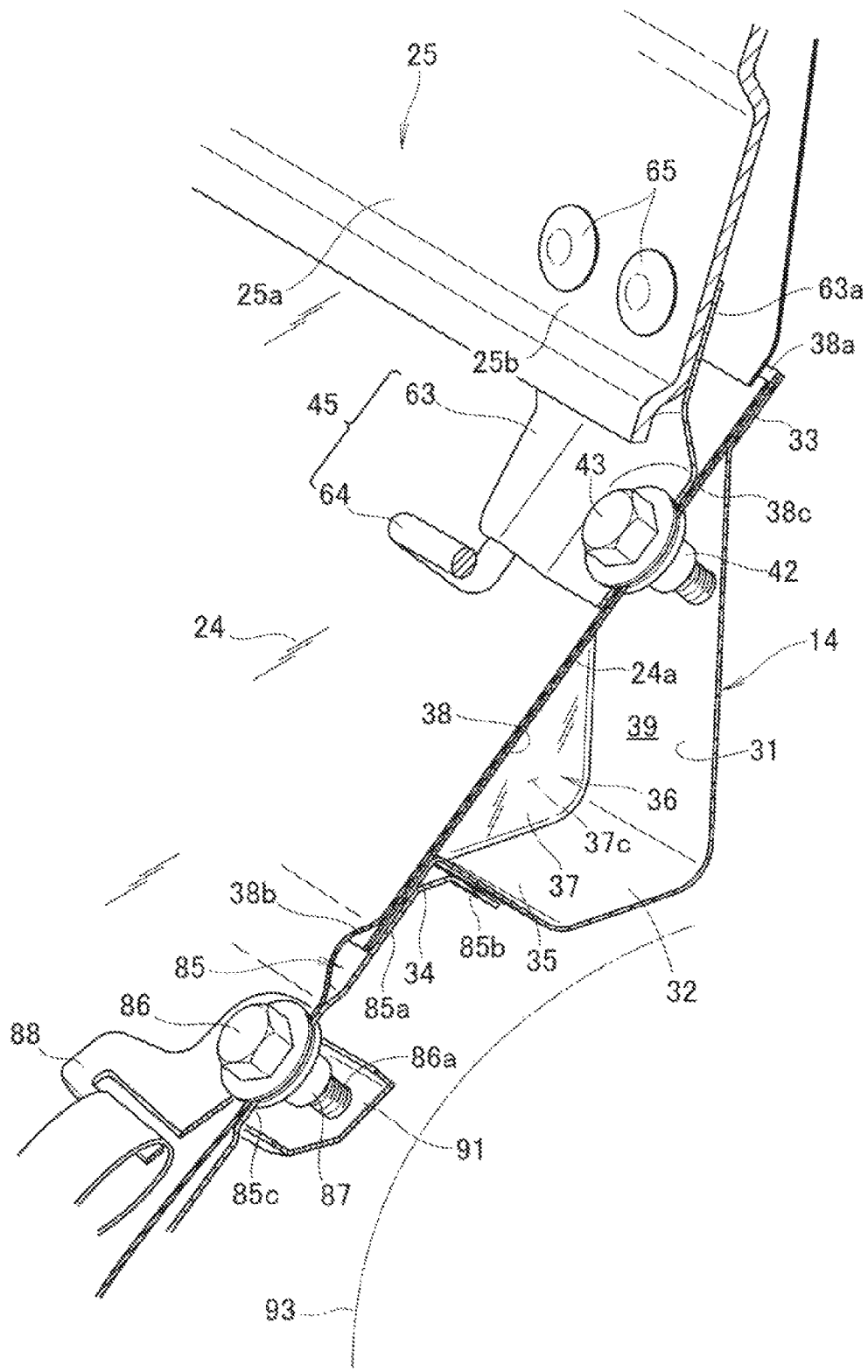
FIG. 4 is a sectional view of the rear structure taken along line IV-IV in FIG. 1.

As illustrated in FIG. 3 and FIG. 4, the first lower cross member 14 includes a vertical wall 31, a horizontal wall 32, an upper flange 33, and a lower flange 34. The first lower cross member 14, including the vertical wall 31 and the horizontal wall 32, has a substantially V-shaped cross section. The upper flange 33 and the lower-flange 34 are joined to an undersurface 24a of the rear floor panel 24.

The upper flange 33 and the lower flange 34 are joined to the undersurface 24a of the rear floor panel 24 such that the first lower cross member 14 and the rear floor panel 24 form a closed section.

Anchor receiving portions 36 are disposed in a middle portion 35 (see FIG. 2) of the first lower cross member 14. Each anchor receiving portion 36 includes a pair of bulkheads 37, disposed in an inner portion 39 of the first lower cross member 14, and an attachment plate 38, which connects the pair of bulkheads 37.

Each bulkhead 37 includes a vertical flange 37a, which is to be joined to the vertical wall 31, and a horizontal flange 37b, which is to be joined to the horizontal wall 32. When the vertical flange 37a is joined to the vertical wall 31 and the horizontal flange 37b is joined to the horizontal wall 32, a partition wall 37c of the bulkhead is disposed so as to cross the longitudinal direction of the first lower cross member 14. Thus, the inner portion 39 of the first lower cross member 14 is partitioned by the partition wall 37c.

The attachment plate 38 extends across the upper flange 33 and the lower flange 34 of the first lower cross member 14. An upper end portion 38a of the attachment plate 38 is joined to the upper flange 33 of the first lower cross member 14 together with the rear floor panel 24. A lower end portion 38b of the attachment plate 38 is joined to the lower flange 34 of the first lower cross member 14 together with the rear floor panel 24.

A nut 42 is joined to a portion of an undersurface 38c of the attachment plate 38 closer to the upper end portion 38a. When a bolt 43 is tightened, into the nut 42, a first seat anchor (seat anchors) 45 is fastened to the anchor receiving portion 36.

Each of the first seat anchors 45 is an anchor disposed in a middle portion in a vehicle widthwise direction to support a child seat 47 (see FIG. 1).

Figure 5:
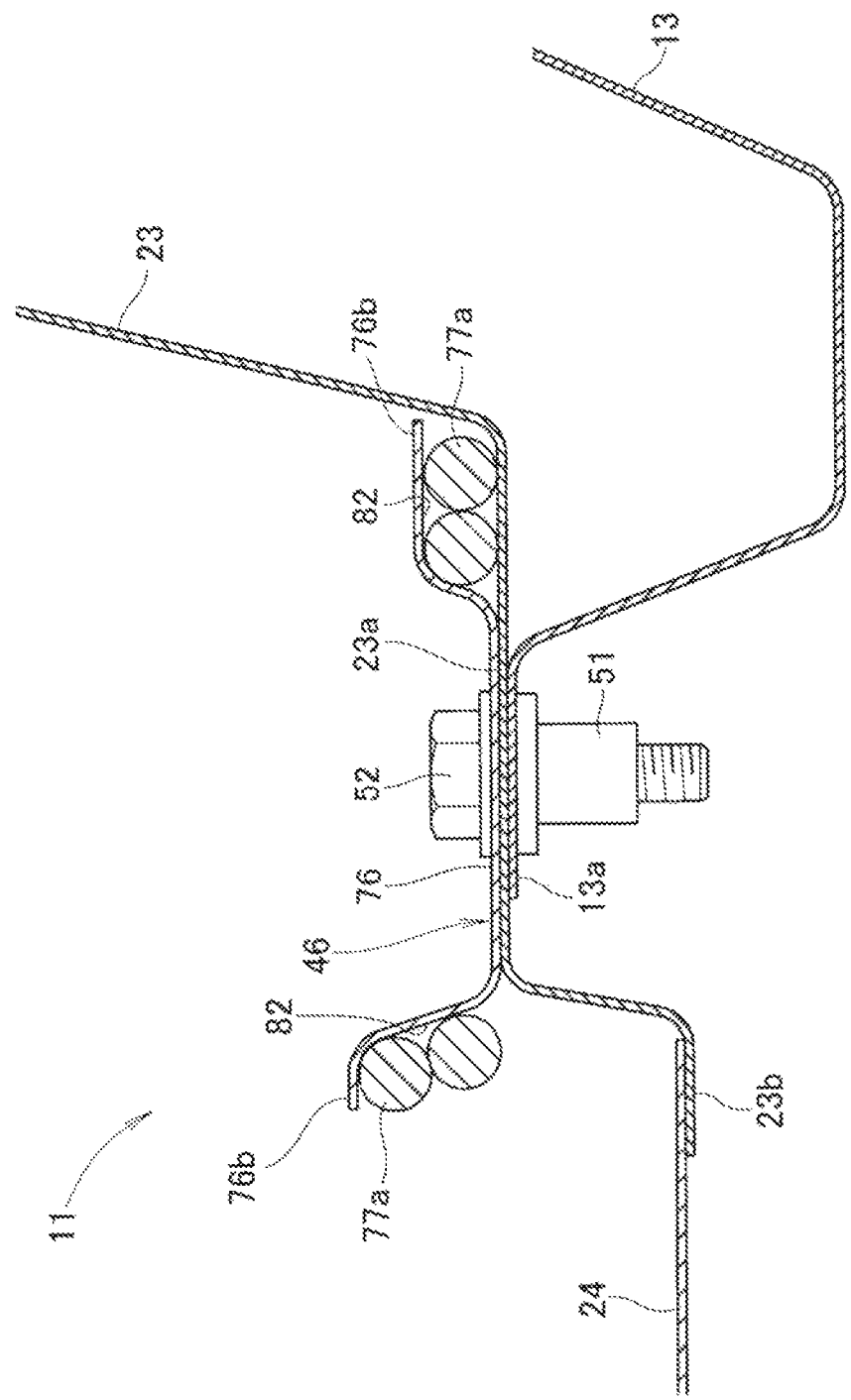
FIG. 5 is a sectional view of the rear structure taken along line V-V in FIG. 1.

As illustrated in FIG. 5, an inner stepped portion 23a of the rear side panel 23 is joined to an upper side of an inner flange 13a of the rear frame 13. The rear floor panel 24 is joined to an upper side of an inner flange 23b of the inner stepped portion 23a. A nut 51 is joined to the undersurface of the inner flange 13a of the rear frame 13.

By tightening a bolt 52 into the nut 51, a second seat anchor (seat anchors) 46 is fastened to the inner flange 13a of the rear frame 13 and the inner stepped portion 23a of the rear side panel 23. Each of the second seat anchors 46 are anchors disposed at outer portions in the vehicle widthwise direction to support the child seat 47 (see FIG. 1).

Figure 6:
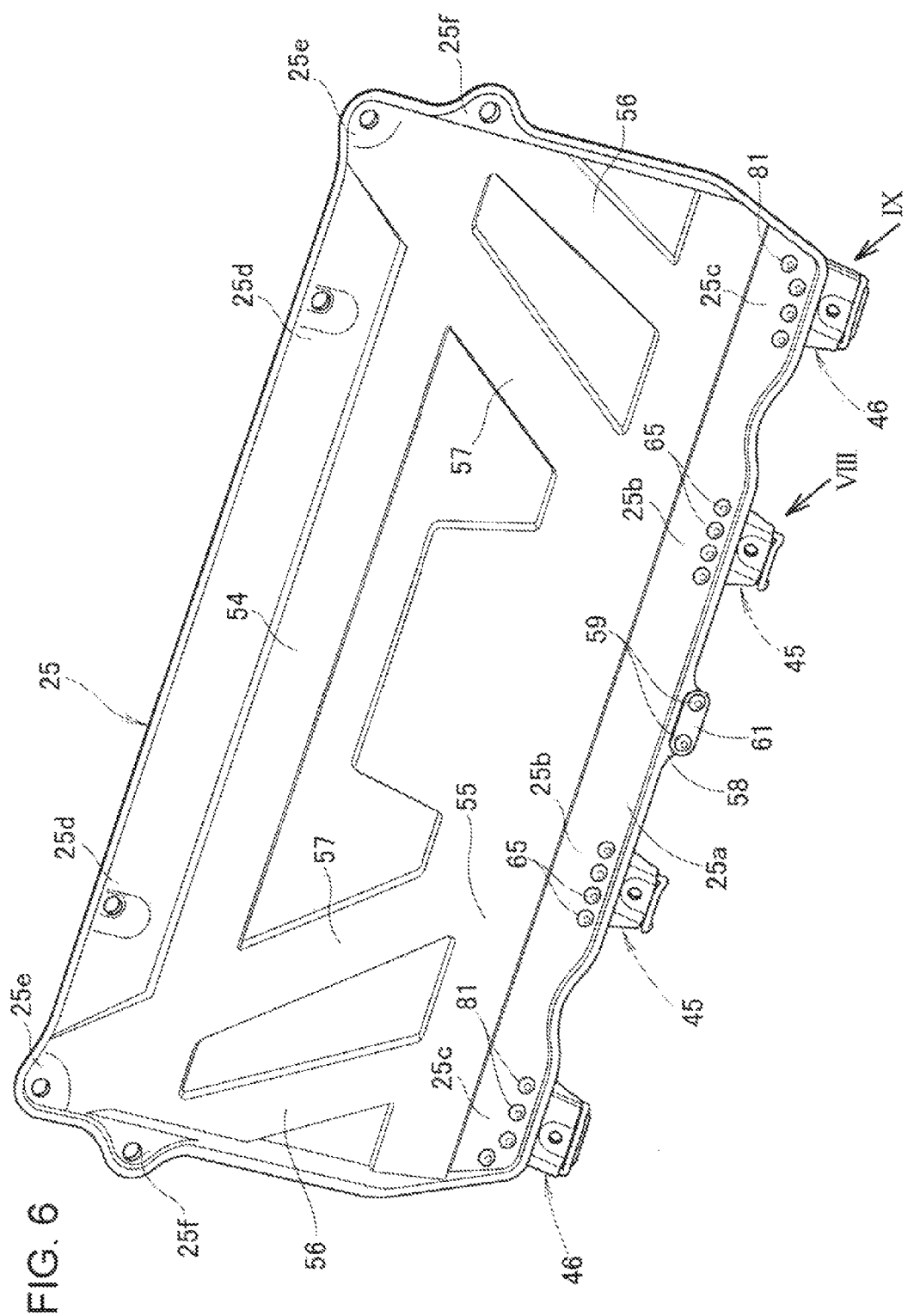
FIG. 6 is a perspective view of the rear bulkhead in FIG. 1.

As illustrated in FIG. 6, the first seat anchors 45 and the second seat anchors 46 are attached to the rear bulkhead 25 made of an aluminium alloy and having a plate thickness greater than that of a steel plate. The rear bulkhead 25 has a substantially rectangular shape when viewed in a plan. The rear bulkhead 25 includes multiple reinforcing beads 54 to 57 and a protrusion 58, which protrudes downward from a middle portion of a lower end portion 25a of the rear bulkhead 25 in the vehicle widthwise direction.

The first seat anchors 45 are disposed in a middle portion of the lower end portion 25a of the rear bulkhead 25 in the vehicle widthwise direction and the second seat anchors 46 are disposed at outer portions of the lower end portion 25a in the vehicle widthwise direction. By fastening rivets 59 to both end portions of the protrusion 58, a coupling portion 61 made of steel is attached to the protrusion 58 with the rivets 59. The first seat anchors 45 are attached to portions on the left and right sides of the coupling portion 61.

Figure 7:
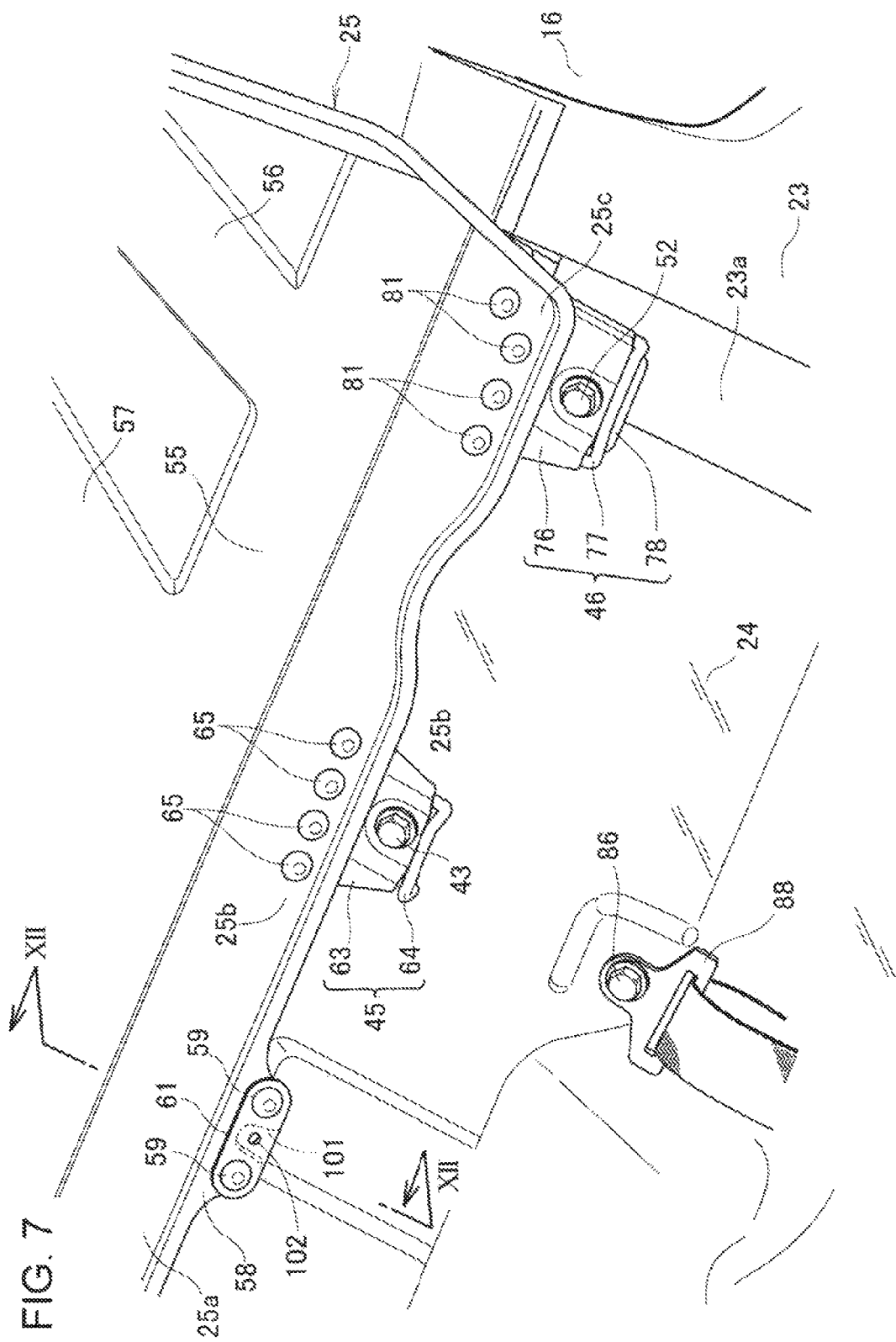
FIG. 7 is an enlarged view of a portion encircled with line VII-VII in FIG. 1.

As illustrated in FIG. 4 and FIG. 7, the first seat anchor 45 includes an anchor bracket 63, which is coupled to a middle portion 25b of the lower end portion 25a of the rear bulkhead 25 in the vehicle widthwise direction, which is on the left side, and an anchor portion 64, which is substantially U-shaped and attached to the anchor bracket 63.

The middle portion 25b of the lower end portion 25a of the rear bulkhead 25 in the vehicle widthwise direction, which is on the left side, is hereinafter referred to as a "middle portion 25b".

An upper end portion 63a of the anchor bracket 63 is superposed on the lower end portion 25a of the rear bulkhead 25 from the vehicle rear. The upper end portion 63a thus superposed is coupled to the middle portion 25b with multiple rivets (specifically, four rivets) 65.

Using two or more rivets 65 enables dispersion of the load so that even a rear bulkhead made of a plate can support the upper end portion 63a of each anchor bracket 63. For fixing the upper end portion 63a of each anchor bracket 63 to the rear bulkhead 25 made of an aluminium alloy with rivets, using four rivets 65 is preferable.

Figure 8:
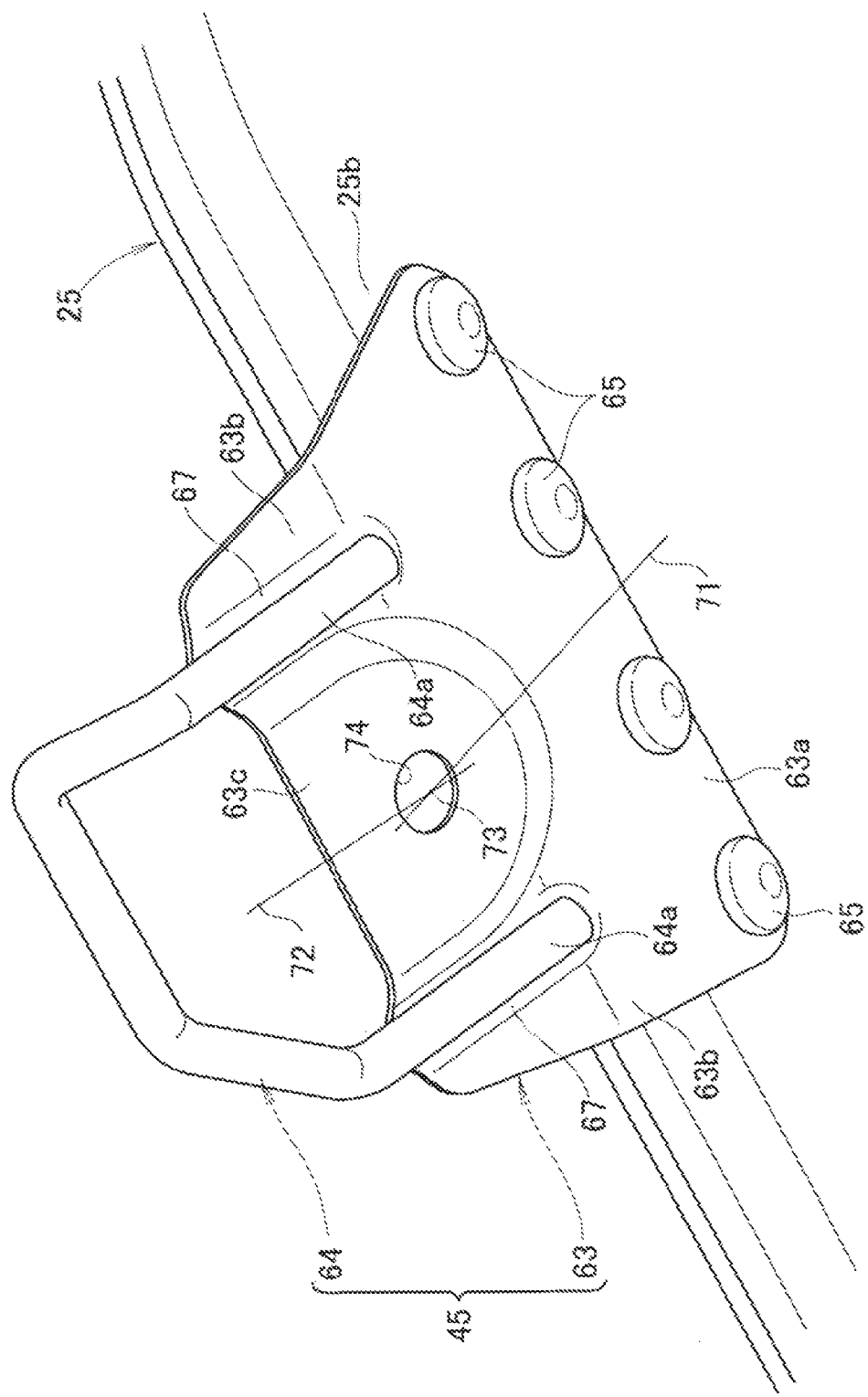
FIG. 8 is a view of the rear bulkhead when viewed in the direction of arrow VIII-VIII in FIG. 6.

As illustrated in FIG. 8, recesses 67 are formed at both side portions 63b of each anchor bracket 63. Each recess 67 is formed such that its upper portion juts out and its lower portion has a recessed shape. Both end portions 64a of each anchor portion 64 having a substantially U shape are joined to the inner portions of both recesses 67 from below.

Each of the substantially U-shaped anchor portion 64 is formed by bending a steel bar into a substantially U shape and then bending the steel bar into a substantially L shape in a side view.

When both end portions 64a of each anchor portion 64 are joined to both recesses 67, openings of the substantially D-shaped anchor portion 64 are closed by a lower end portion 63c of the corresponding anchor bracket 63. Thus, the anchor portion 64 is firmly attached, to the anchor bracket 63.

An attachment member 48 of the child seat 47 (see FIG. 1) is fastened to the anchor portion 64.

Here, a vehicle-widthwise center 71 of the anchor bracket 63 and a vehicle-widthwise center 72 of the anchor portion 64 intersect (cross) at a point 73, at which a coupling hole (connection portion) 74 is formed. Since the coupling hole 74 is formed at only the intersection point 73, the number of connection portions can be reduced to one.

The vehicle-widthwise center 71 of the anchor bracket 63 represents the vehicle-widthwise center of the upper end portion 63a (specifically, a portion that is coupled to the lower end portion 25a of the rear bulkhead 25 with the multiple rivets 65) of the anchor bracket 63.

As illustrated in FIG. 3 and FIG. 4, in the state where the anchor bracket 63 is superposed on the rear floor panel 24 and the attachment plate 38 of the corresponding anchor receiving portion 36, the bolt 43 inserted into the coupling hole 74 (see FIG. 8) is coupled to the nut 42. Thus, the anchor bracket 63 is fastened to the attachment plate 38 (or the anchor receiving portion 36 or the pair of bulkheads 37) together with the rear floor panel 24 using the bolt 43 and the nut 42.

Here, a pair of bulkheads 37 are disposed in the inner portion 39 of the first lower cross member 14 and the vertical flanges 37a and the horizontal flanges 37b are joined to the first lower cross member 14. Thus, the bulkheads 37 are members having high strength and rigidity.

The anchor bracket 63 is coupled to the bulkheads 37. The anchor bracket 63 can thus be firmly supported by the bulkheads 37. The anchor bracket 63 can thus fully support a tensile load imposed on the anchor portion 64 from the child seat 47 (see FIG. 1), so that load support strength can be enhanced.

In addition, the coupling hole 74 (see FIG. 8) is formed at the intersection point 73 at which the vehicle-width wise center 71 of the anchor bracket 63 and the vehicle-widthwise center 72 of the anchor portion 64 intersect with each other. In addition, the coupling hole 74 is coupled to the attachment plate 38 (or the anchor receiving portion 36 or the pair of bulkheads 37) together with the rear floor panel 24 using the bolt 43 and the nut 42.

The coupling hole 74 is thus positioned on an extension line of a tensile load when the tensile load is imposed on the anchor portion 64 from the child seat 47. Thus, the tensile lead imposed on the anchor portion 64 can be stably borne at the coupling hole 74 (specifically, by the bolt 43), so that the load can be highly stably borne.

When the coupling hole 74 (see FIG. 8) is formed at the intersection point 73 at which the vehicle-widthwise center 71 of the anchor bracket 63 and the vehicle-widthwise center 72 of the anchor portion 64 intersect with each other, the tensile load transmitted to the coupling hole 74 (that is, the bolt 43) can be efficiently dispersed throughout the entire area of the anchor bracket 63, so that a so-called load dispersing effect can be enhanced.

Since the load support stability and the load dispersion effect are thus enhanced, support strength high enough to bear the tensile load can be obtained in a simple configuration in which the anchor bracket 63 has the coupling hole 74 at the intersection point.

Referring back to FIG. 6, the second seat anchors 46 are disposed on the lower end portion 25a of the rear bulkhead 25 on the outer sides of the first seat anchors 45 in the vehicle widthwise direction. In other words, each second seat anchor 46 is attached to the lower end portion 25a of the rear bulkhead 25 at a corner portion 25c on the outer side in the vehicle widthwise direction (outer left and right side).

Figure 9:
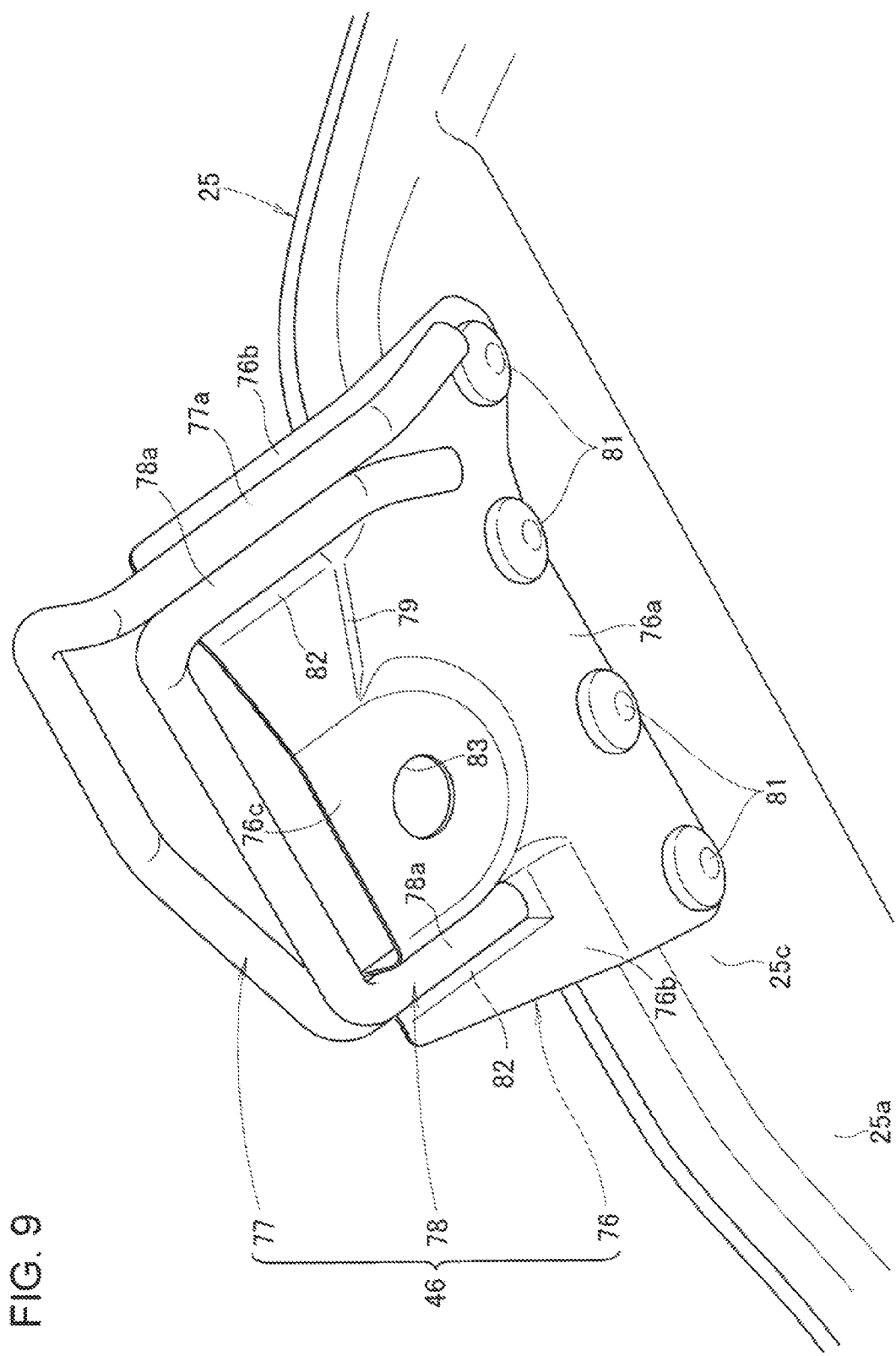
FIG. 9 is a view of the rear bulkhead when viewed in the direction of arrow IX-IX in FIG. 6.

As illustrated in FIG. 5 and FIG. 9, each second seat anchor 46 includes an anchor bracket 76, coupled to the lower end portion 25a of the rear bulkhead 25 at the corner portion 25c on the outer side in the vehicle widthwise direction, a substantially U-shaped anchor portion 77, attached to the anchor bracket 76, and a substantially U-shaped reinforcing member 78 attached to the anchor bracket 76 at a portion adjacent to the anchor portion 77.

In the lower end portion 25a of the rear bulkhead 25, the corner portion 25c on the outer side in the vehicle widthwise direction is hereinafter referred to as a "vehicle-widthwise outer corner portion 25c".

The anchor bracket 76 includes a fold portion 79 on the outer side of the vehicle-widthwise center. The fold portion 79 is bent along the vehicle-widthwise outer corner portion 25c of the rear bulkhead 25. In other words, the fold portion 79 extends in the widthwise direction of the anchor bracket 76. The substantially U-shaped reinforcing member 78 is disposed on the outer side of the fold portion 79.

An upper end portion 76a of the anchor bracket 76 is superposed on the vehicle-widthwise outer corner portion 25c of the rear bulkhead 25 from the vehicle rear. The upper end portion 76a thus superposed is coupled to the vehicle-widthwise outer corner portion 25c using multiple rivets 81.

A coupling hole 83 is formed at a portion positioned on the inner side with respect to the substantially center of the anchor bracket 76 in the vehicle widthwise direction. Recesses 82 are formed at both side portions 76b of the anchor bracket 76. Each recess 82 is formed such that its upper portion juts out. The fold portion 79 is disposed adjacent to the outer one of the recesses 82 (disposed on the outer side with respect to the vehicle-widthwise center) and a lower end portion 76c of the anchor bracket 76 is formed in a recessed shape and so as to extend downward.

Both end portions 77a of the substantially U-shaped anchor portion 77 are joined to both recesses 82. Thus, openings of the substantially U-shaped anchor portion 77 are closed with the lower end portion 76c of the anchor bracket 76. The anchor portion 77 is thus firmly attached to the anchor bracket 76.

An attachment member 49 (see FIG. 1) of the child seat 47 is fastened to the anchor portion 77.

Both end portions 78a of the substantially U-shaped reinforcing member 78 are joined to both recesses 82.

In the state where the inner stepped portion 23a of each rear side panel 23 is joined to an upper side of the inner flange 13a of the corresponding rear frame 13, the bolt 52 is inserted into the coupling hole 83 and tightened into the nut 51. Thus, the second seat anchor 46 is tightened to the inner stepped portion 23a of the rear side panel 23 and the inner flange 13a of the rear frame 13.

In this manner, each anchor bracket 76 is coupled to the corresponding vehicle-widthwise outer corner portion 25c of the rear bulkhead 25 and each anchor bracket 76 is coupled with the inner stepped portion 23a of the corresponding rear side panel 23 and the inner flange 13a of the corresponding rear frame 13.

Each rear frame 13 is a long member that extends in the vehicle front-rear direction. By coupling the anchor-bracket 76 to the inner flange 13a of this long rear frame 13, the tensile load imposed on the anchor bracket 76 can be efficiently dispersed over the rear frame 13. The tensile load imposed on each anchor bracket 76 can thus be fully borne by the corresponding rear frame 13.

Here, each rear frame 13 is a member that constitutes the vehicle body 11. Each anchor bracket 76 is supported by using the corresponding rear frame 13. This configuration can eliminate a member specially designed for supporting each anchor bracket 76. The rear structure 10 of a vehicle body can thus be simplified and lightened.

In addition, the anchor bracket 76 includes the fold portion 79 extending in the widthwise direction and the U-shaped reinforcing member 78 is disposed on the outer side of the fold portion 79. Thus, the strength and the rigidity of each anchor bracket 76 on both sides can be secured by the corresponding reinforcing member 78 without being affected by the fold portion 79.

Even when the tensile load in the vehicle widthwise direction (that is, lateral direction) is imposed on each anchor bracket. 76, the tensile load thus imposed can be borne by the anchor bracket 76 without the fold portion 79 being deformed.

As illustrated in FIG. 2, the first seat anchors 45 and the second seat, anchors 46 are coupled to the rear bulkhead 25. Thus, by attaching the rear bulkhead 25 to the vehicle body 11, the first seat anchors 45 and the second seat, anchors 46 can be attached to the vehicle body 11.

This configuration can reduce the number of components attached to the vehicle body 11 compared to the case where the rear bulkhead 25 and the seat anchors 45 are separately attached to the vehicle body 11. In other words, the number of components attached to the vehicle body 11 can be reduced.

Specifically, this configuration can enhance the efficiency in installing the rear bulkhead 25, the first seat anchors 45, and the second seat anchors 46 and thus enhance the productivity.

As illustrated in FIG. 3 and FIG. 4, a coupling bracket 85 is joined to the horizontal wall 32 and the lower flange 34 of the first lower cross member 14 at a portion adjacent to the anchor receiving portion 36 (particularly, a pair of bulkheads 37). Specifically, an upper end portion. 85a and an upper flange 85b of the coupling bracket 85 are joined to the horizontal wall 32 and the lower flange 34 from the vehicle rear.

Thus, the coupling bracket 35 is firmly supported by the horizontal wall 32 and the lower flange 34 with a pair of bulkheads 37.

A nut 87 is coupled to the coupling bracket 35 from the vehicle rear and the nut 87 is disposed on the vehicle rear side of the rear floor panel 24. A bolt (coupling member) 86 is coupled to the nut 87 and a seat belt anchor (that is, a typical seat belt anchor) 88 is coupled to the coupling bracket 85.

Thus, the seat belt anchor 88 is firmly supported by the coupling bracket 85. The tensile load imposed on the seat belt anchor 88 is thus fully borne by the coupling bracket 85.

A seat belt (a typical seat belt) is coupled to the seat belt anchor 88. The seat belt restrains an occupant seated on the seat cushion 21 (see FIG. 1).

Figure 10:
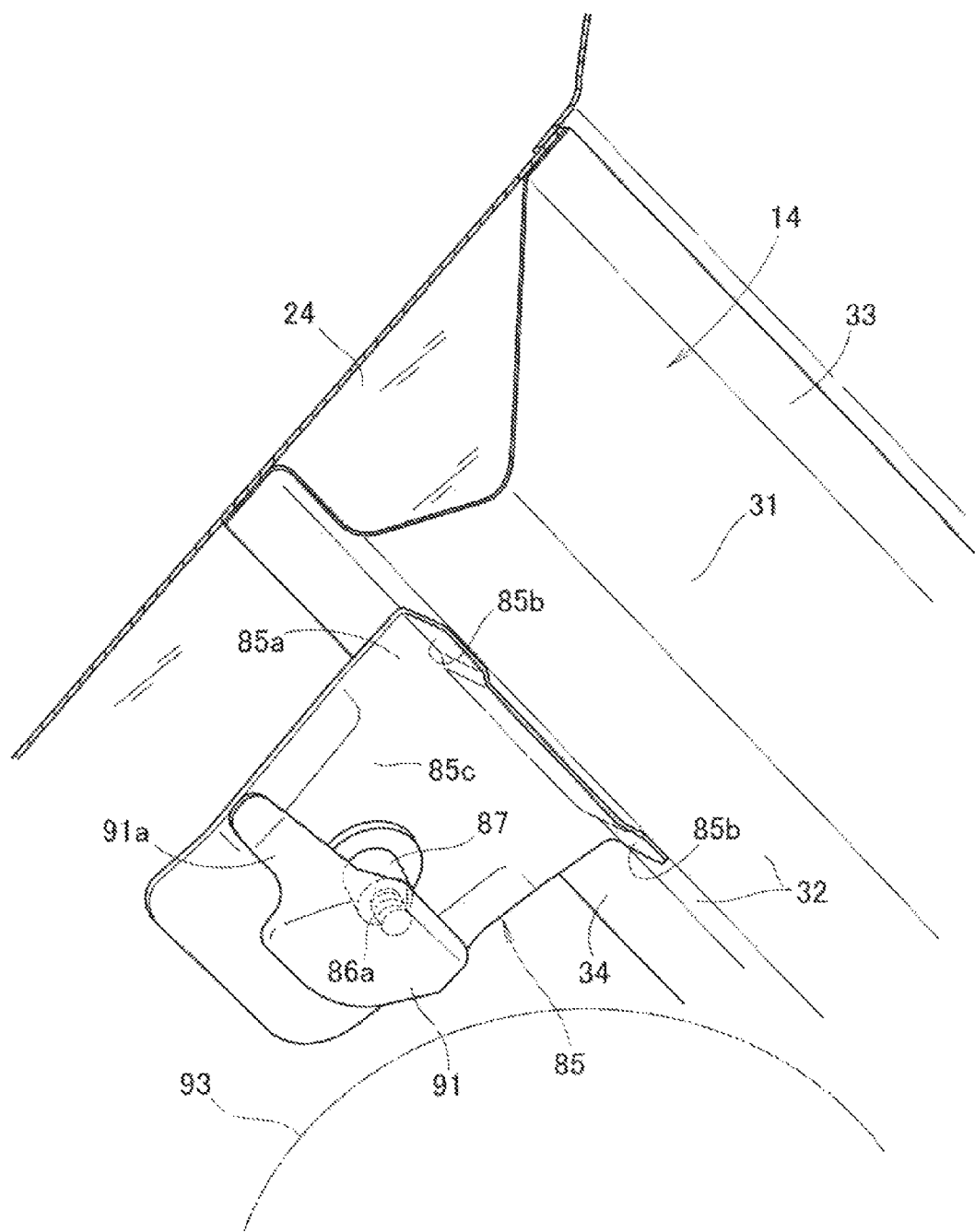
FIG. 10 is a view of the rear bulkhead when viewed in the direction of arrow X-X in FIG. 3.

As illustrated in FIG. 4 and FIG. 10, a pair of leg portions 91a (only one of the leg portions 91a is illustrated) of a cover member 31 is disposed, on an under surface 85c of the coupling bracket 85. An end portion 86a of the bolt 86 coupled, to the nut 87 is covered with the cover member 91 from the vehicle rear.

Here, it is conceivable that a vehicle-mounted member such as a fuel tank 93 (specifically, a hydrogen tank) is disposed on the vehicle rear side of the coupling bracket 85. The cover member 91 is thus disposed on the coupling bracket 85 to cover the end portion 86a of the bolt 86 from the vehicle rear.

In case of, for example, a rear collision, the end portion 86a of the bolt 86 is prevented from colliding against a vehicle-mounted member such as the fuel tank 93. This configuration can thus protect a vehicle-mounted member.

Figure 11:
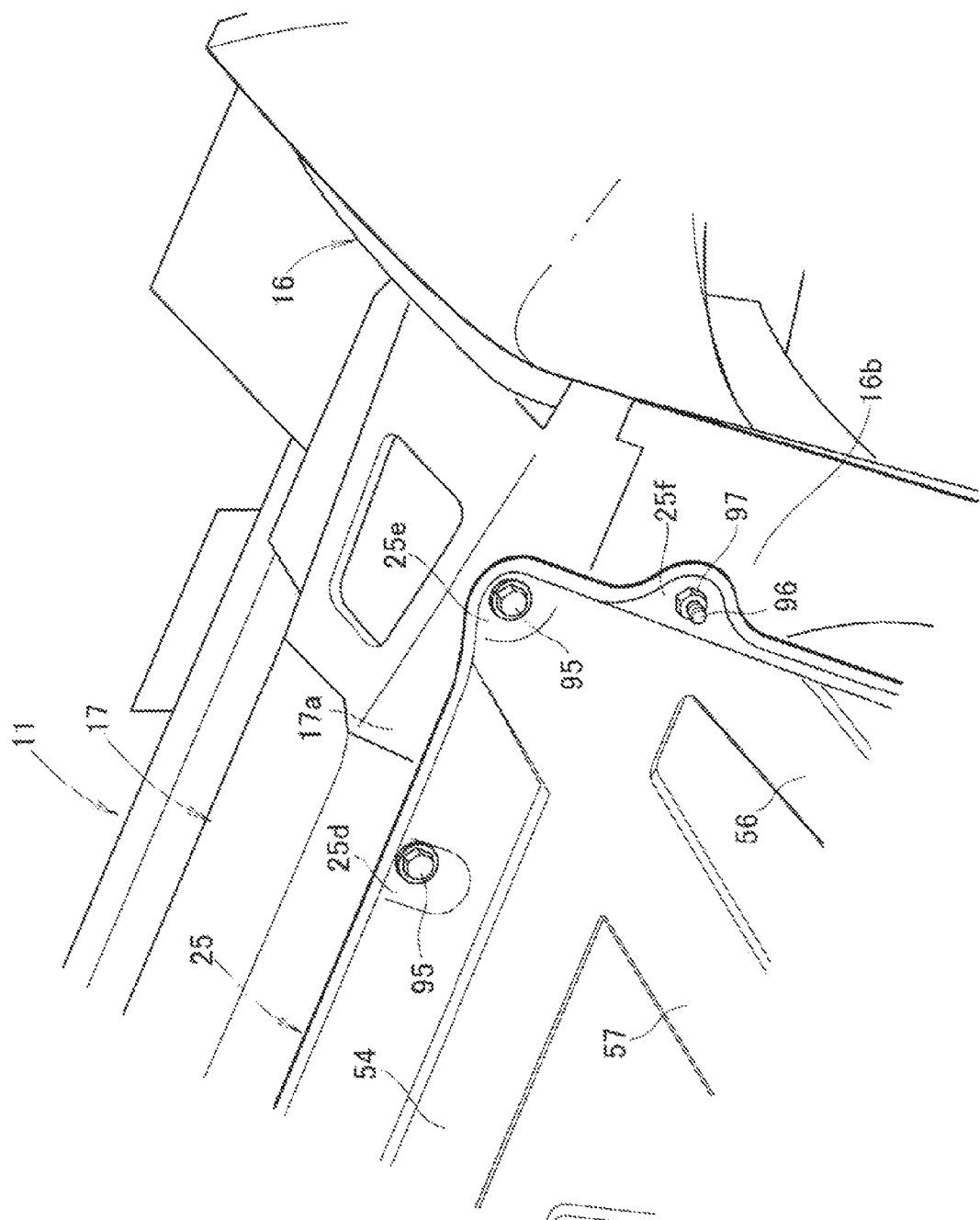
FIG. 11 is an enlarged view of a portion encircled with line XI-XI in FIG. 1.

As illustrated in FIG. 11, an upper left edge portion (upper portion) 25d and an upper left corner portion (upper portion) 25e of the rear bulkhead 25 are coupled to a front left end portion 17a of the upper cross member 17 with a bolt 95. In addition, an upper left side edge portion (upper portion) 25f of the rear bulkhead 25 is coupled to an upper front portion 16b of the rear wheel house 16 with a bolt 96 and a nut 97.

Here, the rear wheel houses 16 and the upper cross member 17 are components constituting the vehicle body 11. Specifically, the upper left edge portion 25d, the upper left corner portion 25e, and the upper left side edge portion 25f of the rear bulkhead 25 are portions that are coupled to the vehicle body 11. Thus, the vehicle body 11 can be reinforced with the rear bulkhead 25, so that the strength and the rigidity of the vehicle body 11 can be enhanced.

The upper left edge portion 25d, the upper left corner portion 25e, and the upper left side edge portion 25f of the rear bulkhead 25 are coupled to the vehicle body 11.

As illustrated in FIG. 3, each first seat anchor 45 is tightened to the corresponding anchor receiving portion 36 (that is, the vehicle body 11) with the bolt 43 and the nut 42 (see FIG. 4). Each first seat anchor 45 is coupled to the middle portion 25b of the rear bulkhead 25 using multiple rivets 65. In other words, the middle portion 25b of the rear bulkhead 25 is coupled to the vehicle body 11.

In addition, as illustrated in FIG. 5, each second seat anchor 46 is tightened to the inner flange 13a (that is, the vehicle body 11) of the corresponding rear frame 13 with the bolt 52 and the nut 51. The second seat anchor 46 is coupled to the vehicle-widthwise outer corner portion 25c of the rear bulkhead 25 using multiple rivets 81.

In other words, the vehicle-widthwise outer corner portion 25c of the rear bulkhead 25 is coupled to the vehicle body 11.

As illustrated in FIG. 6, multiple beads 54 to 57 are directed toward the upper left edge portions 25d, the upper left corner portions 25e, the upper left side edge portions 25f, the middle portions 25b, and the vehicle-widthwise outer corner portions 25c of the rear bulkhead 25.

The upper left edge portions 25d, the upper left corner portions 25e, the upper left side edge portions 25f, the middle portions 25b, and the vehicle-widthwise outer corner portions 25c are portions coupled with the vehicle body 11 (see FIG. 1).

Specifically, the strength and the rigidity of the portions coupled with the vehicle body 11 are enhanced with the multiple beads 54 to 57. Thus, the strength (so-called support strength) against the tensile load imposed on the first seat anchors 45 or the second seat anchors 46 can be enhanced. The tensile load can thus be preferably borne by the first seat anchors 45 and the second seat anchors 46.

Figure 12:
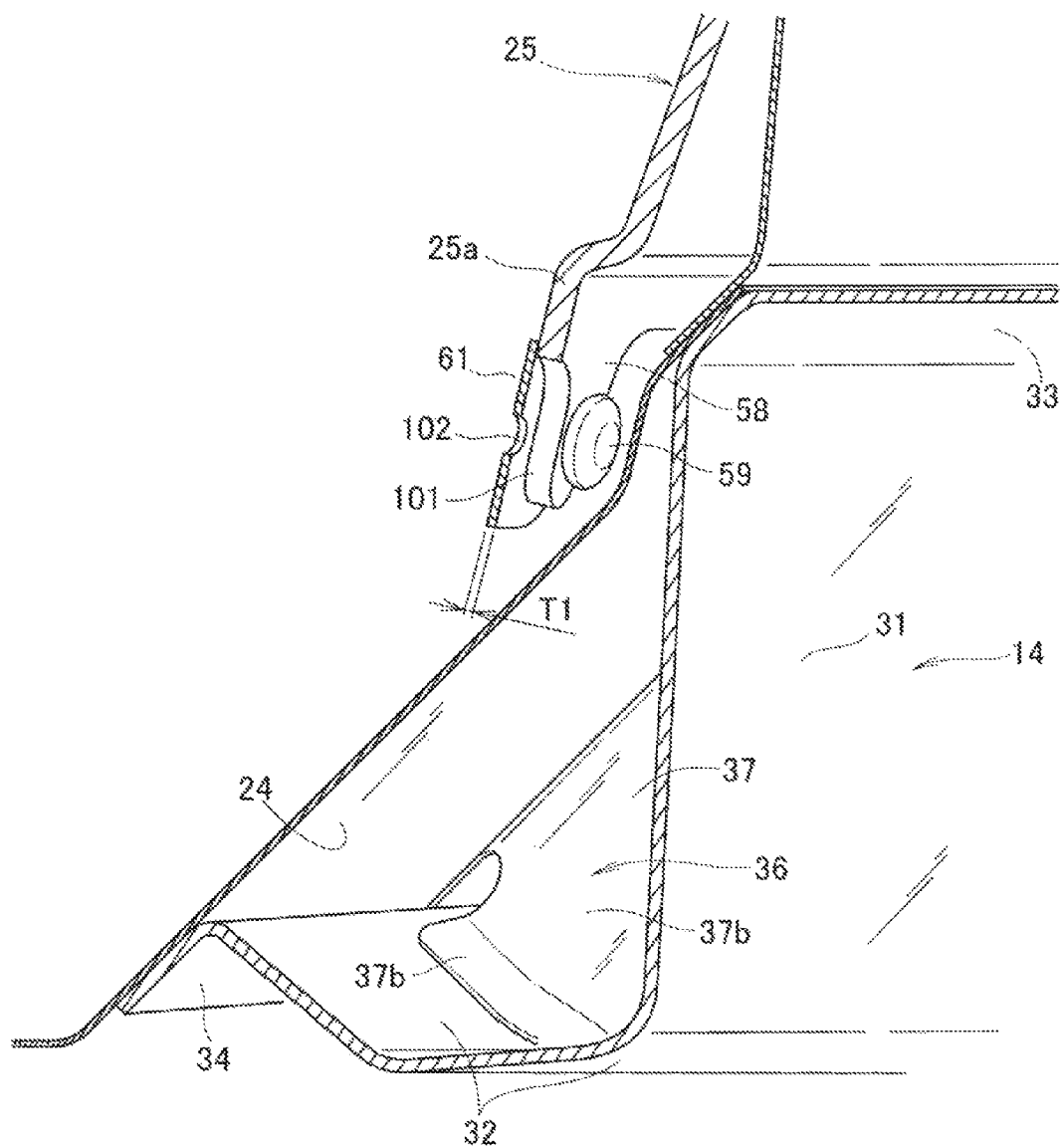
FIG. 12 is a sectional view of the portion taken along line XII-XII in FIG. 7.

As illustrated in FIG. 7 and FIG. 12, the protrusion 58 protrudes downward from the vehicle-widthwise center of the lower end portion 25a of the rear bulkhead 25. A recess 101 is formed at the middle of the protrusion 58 so as to open downward. The coupling portion 61 made of steel is attached to both end portions of the protrusion 58 using the rivets 59.

An attachment hole 102 is formed at the middle of the coupling portion 61. The attachment hole 102 is positioned so as to face the recess 101. A coupling device (such as a bolt or clip) of the seat cushion 21 is attached to the attachment hole 102.

As illustrated in FIG. 1 and FIG. 2, the attachment bracket 18 has attachment holes 19 at a left end portion and a right end portion. Fastening devices (such as hooks) of the seat cushion 21 are attached to the attachment holes 19.

When a coupling device is attached to the attachment hole 102 of the coupling portion 61 and fastening devices are attached to the attachment holes 19 of the attachment bracket 18, the seat cushion 21 is supported by the vehicle body 11.

Here, by disposing the coupling portion 61 on the protrusion 58, the coupling portion 61 can be made as a member separate from the protrusion 58. Thus, the coupling portion 61 made of steel can have a plate thickness T1 the same as the plate thickness of the attachment bracket 18 while the coupling portion 61 retains its strength and rigidity.

Thus, even in the case, for example, where the rear bulkhead 25 is made of an aluminium alloy and has a plate thickness larger than the plate thickness of the attachment bracket 18 made of steel, an existing coupling device of the seat cushion 21 can be attached to the attachment hole 102 of the coupling portion 61 without there being a need for changing the existing coupling device of the seat cushion 21.

Since the rear structure is compatible with the existing seat cushion 21, the need for another seat cushion is eliminated and a stock management is thus facilitated.

In addition, the rear bulkhead 25 can be lightened with the use of a material such as an aluminium alloy as the material of the rear bulkhead 25.

A rear structure of a vehicle body according to the present application is not limited the above-described embodiment and may be modified or improved as appropriate.

In the above-described embodiment, the first seat anchors 45 and the second seat anchors 46 that support the child seat 47 are described as examples of the present application. This is not the only configuration, however. The present application can be applied to a seat belt anchor that supports a seat belt.

In the above-described embodiment, the case where the anchor bracket 63 of each first seat anchor 45 is coupled to the middle portion 25b of the rear bulkhead 25 using four rivets 65 is described as an example. This is not the only configuration, however. The anchor bracket 63 may be coupled to the middle portion 25b of the rear bulkhead 25 using the rivets 65 at, for example, two or more portions.

The shapes or the configurations of the vehicle-body rear structure, the vehicle body, the rear frames, the first lower cross member, the rear wheel houses, the upper cross member, the attachment bracket, the seat cushion, the rear floor panel, the rear bulkhead, the bulkheads, the first seat anchors, the second seat anchors, the child seat, the beads, the protrusion, the coupling portion, the anchor brackets, the anchor portions, the coupling holes, the reinforcing members, the fold portions, the coupling brackets, the seat belt anchors, the cover members, or other components used in the embodiment are not limited to those illustrated in the embodiment and may be changed appropriately.

The present application is preferably usable in an automobile including a rear structure of a vehicle body in which a rear bulkhead is erected from a floor panel to separate a passenger compartment from a cargo compartment. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A rear structure of a vehicle body, the rear structure comprising
    a floor panel;
    a rear bulkhead coupled to the vehicle body in a state of being erected from the floor panel, the rear bulkhead partitioning a passenger compartment from a cargo compartment; and
    a seat anchor that is coupled to the rear bulkhead for supporting a child seat,
    wherein the seat anchor includes:
    an anchor bracket including at least two portions coupled to the rear bulkhead, the at least two portions being spaced apart from each other in a vehicle widthwise direction;
    a substantially U-shaped anchor portion whose both end portions are attached anchor bracket; and
    a connection portion coupled to the floor panel, wherein the connection portion is disposed at an intersection point at which a center line of the anchor bracket in the vehicle widthwise direction and a center line of the anchor portion in the vehicle widthwise direction intersect with each other.

2. The rear structure according to claim 1, wherein the rear bulkhead includes a bead directed toward a portion of the rear bulkhead coupled to the vehicle body.

3. The rear stricture according to claim 1, further comprising:
    rear frames disposed on a left side and a right side of the floor panel, respectively;
    a cross member extending across the rear frames and joined to an undersurface of the floor panel;
    a bulkhead disposed in an inner portion of the cross member,
    wherein the anchor bracket is coupled to the bulkhead.

4. The rear structure according to claim 3, further comprising:
    a coupling bracket provided to a portion of the cross member in the vicinity of the bulkhead and to which a seat belt anchor that supports a seat belt is to be coupled; and
    a cover member disposed on the coupling bracket to cover a coupling member that couples the seat belt anchor to the coupling bracket.

5. The rear structure according to claim 1, further comprising:
   rear frames disposed on a left side and a right side of the floor panel, respectively,
   wherein the seat anchor is coupled to an outer left portion or an outer right portion of the rear bulkhead, and
   wherein the seat anchor includes a anchor bracket coupled to one of the rear frames.

6. The rear structure according to claim 5,
   wherein the anchor bracket includes a fold portion extending along a corner portion of the rear bulkhead, and
   wherein the seat anchor includes a U-shaped reinforcing member disposed on an outer side of the fold portion in a vehicle width direction.

7. The rear structure according to claim 3, further comprising:
   rear wheel houses joined to the rear frames, respectively; and
   an upper cross member extending across upper portions of the rear wheel houses,
   wherein the rear bulkhead includes an upper portion coupled to the upper cross member and the rear wheel houses.

8. The rear structure according to claim 1,
   wherein the rear bulkhead includes a protrusion disposed at a center of a lower end portion of the rear bulkhead in a vehicle widthwise direction, the protrusion protruding downward, and
   wherein the protrusion includes a coupling portion for receiving a seat cushion.

9. The rear structure according to claim 1, wherein the center line of the anchor bracket in the vehicle widthwise direction runs through a vehicle-widthwise center of an upper end portion of the anchor bracket coupled to a lower end portion of the rear bulkhead.

10. The rear structure according to claim 3, wherein the anchor bracket, the bulkhead and the floor panel are fastened together by a fastening member.

11. A vehicle comprising the rear structure according to claim 1.

12. A rear structure of a vehicle body, the rear structure comprising
   a floor panel;
   a rear bulkhead coupled to the vehicle body in a state of being erected from the floor panel, the rear bulkhead partitioning a passenger compartment from a cargo compartment;
   a seat anchor that is coupled to the rear bulkhead for supporting a child seat: and
   rear frames disposed on a left side and a right side of the floor panel, respectively,
   wherein the seat anchor is coupled to an outer left portion or an outer right portion of the rear bulkhead, and
   wherein the seat anchor includes a anchor bracket coupled to one of the rear frames.

13. The rear structure according to claim 12,
   wherein the anchor bracket includes a fold portion extending along a corner portion of the rear bulkhead, and
   wherein the seat anchor includes a U-shaped reinforcing member disposed on an outer side of the fold portion in a vehicle width direction.

14. A rear structure of a vehicle body, the rear structure comprising
   a floor panel;
   a rear bulkhead coupled to the vehicle body in a state of being erected from the floor panel, the rear bulkhead partitioning a passenger compartment from a cargo compartment; and
   a seat anchor that is coupled to the rear bulkhead for supporting a child seat,
   wherein the rear bulkhead includes a protrusion disposed at a center of a lower end portion of the rear bulkhead in a vehicle widthwise direction, the protrusion protruding downward, and
   wherein the protrusion includes a coupling portion for receiving a seat cushion.

* * * * *